MOTIONAL CORRELATION IN REDUCED BAND WIDTH TELEVISION

Filed Dec. 30, 1949 5 Sheets-Sheet 1

INVENTOR
R. E. GRAHAM
BY Hugh S. Wertz
ATTORNEY

INVENTOR
R. E. GRAHAM
BY Hugh S. Wertz
ATTORNEY

MOTIONAL CORRELATION IN REDUCED BAND WIDTH TELEVISION

Filed Dec. 30, 1949

5 Sheets-Sheet 3

INVENTOR
R. E. GRAHAM
BY Hugh S. Wertz
ATTORNEY

Sept. 15, 1953 R. E. GRAHAM 2,652,449

MOTIONAL CORRELATION IN REDUCED BAND WIDTH TELEVISION

Filed Dec. 30, 1949 5 Sheets-Sheet 4

INVENTOR
R. E. GRAHAM
BY Hugh S. Wertz
ATTORNEY

INVENTOR
R. E. GRAHAM
BY Hugh S. Wertz
ATTORNEY

Patented Sept. 15, 1953

2,652,449

UNITED STATES PATENT OFFICE 2,652,449

MOTIONAL CORRELATION IN REDUCED BAND WIDTH TELEVISION

Robert E. Graham, Morristown, N. J., assignor to Bell Telephone Laboratories, Incorporated, New York, N. Y., a corporation of New York Application December 30, 1949, Serial No. 136,106

10 Claims. (Cl. 178—6.8)

This invention relates to the translation, transmission, reception and reproduction of electric communication signals, particularly television image signals and the like.

In a copending application of the present inventor, Serial No. 136,105, filed December 30, 1949, there is disclosed a system for the reduction of the transmission band width of television image signals in which the reduction is achieved by discarding a major portion of the fine detail video information. The operation of that system is such that when there is appreciable motion in the televised scene there may occur an imperfect register between the coarse and the fine structure, since the coarse video content of the picture is brought up to date more frequently than the fine detail video information.

It is, therefore, the principal object of the present invention to eliminate the imperfect register which may occur between the coarse and the fine video structure in the practice of television band width reduction schemes of the same general type as that disclosed in the above-identified copending application.

In accordance with the invention and in furtherance of its broad object, computer circuits are employed to yield signals approximating the vector components of motion in the pictorial subject and these are used to warp the fine structure to bring it into register with the coarse structure. To accomplish this, one exemplary embodiment of the invention employs techniques for storing the coarse field signal simultaneously on the mosaics of two storage tubes A and B, and for storing a delayed version of the coarse field signal on a third storage tube C. In recovering the time signals from these mosaics, all three are scanned synchronously in the normal scanning pattern and, in addition, a high frequency (i. e., a frequency high compared with the top frequency in the coarse signals) circular scan of circle size comparable with an elemental area of the coarse system is superposed on the normal scanning pattern of mosaics B and C. The signals recovered from these three mosaics, from which can be obtained, in accordance with the invention, the motional information desired, then undergo computer operations which yield signals approximating the vector components of the motion which has actually occurred in the televised scene. It is these output signals which are used to warp the delayed fine structure, in accordance with the invention.

The invention will be more fully understood from the following detailed description of certain illustrative embodiments thereof taken in connection with the appended drawings forming a part thereof, in which.

Figure 1:
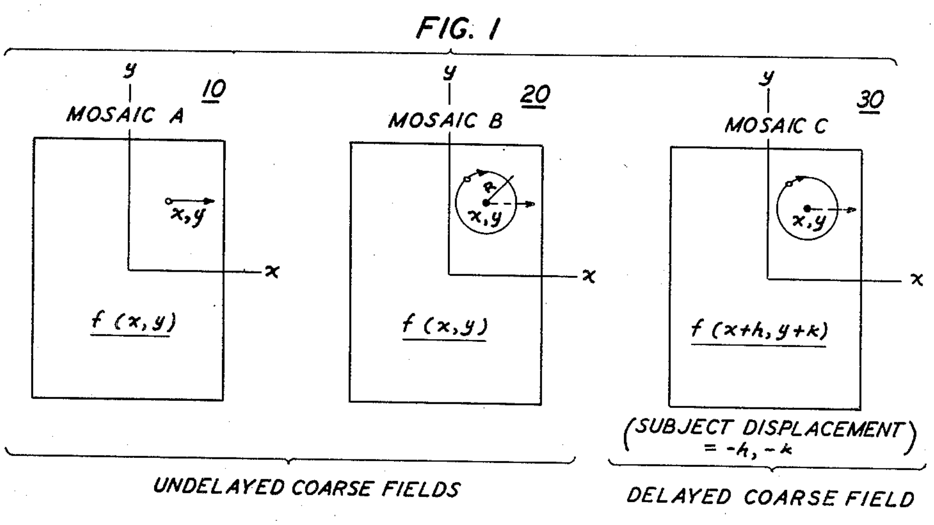
Fig. 1 illustrates the geometrical relationships of the three storage mosaics of the invention.

The geometrical significance of the scanning arrangement of the invention will be apparent from reference to Fig. 1. The coarse field signal, which may be formed in accordance with the techniques and employing the apparatus described in my above-identified copending application, is stored on mosaics A and B (elements 10 and 20, respectively), and the same signal delayed by one frame time is stored similarly on a third mosaic C (element 30). These mosaics are parts of suitable storage tubes. The voltage distributions on these mosaics can be conveniently described as the two-dimensional functions $f(x,y)$ for the original field and $$f(x+h, y+k)$$

for the delayed coarse field, where $x$ and $y$ are ordinary Cartesian coordinates and $-h$ and $-k$ are the $x$ and $y$ components, respectively, of the subject displacement that has taken place during the delay time and are themselves functions of the coordinates $x$, $y$. The type of subject change which is being considered here is, of course, primarily that due to lateral motion of regions of the picture, and does not include sudden changes of scene. The problem is to determine the components $h$, $k$ for each elemental area of the picture from a comparison of the original and the delayed coarse fields. By the nature of the problem, this motional information must be immediately available at any given point in the raster while that point is being scanned, and, in accordance with the invention, such information is both made immediately available and utilized to eliminate any imperfect register which may occur as the result of the motion.

To measure the amount by which a picture convolution centered at a point $x$, $y$ has been displaced, it is obviously necessary to measure at least the second order partial derivatives of the voltage distribution function at that point, viz., $$\frac{\partial^2 f}{\partial x^2}, \frac{\partial^2 f}{\partial y^2}, \text{ and } \frac{\partial^2 f}{\partial x \partial y}$$

A measurement of these derivatives at any point necessarily requires certain information concerning the immediate area surrounding the point, and, in accordance with an exemplary embodiment of the invention, the method chosen to obtain this information involves the superposition of a high frequency circular scan upon the normal scanning pattern used to recover the coarse time signals from storage mosaics B and C (elements 20 and 30). The frequency of revolution of this scan is made high compared with the top frequencies in the coarse signal, so that, for an R. M. A. standard 525-line television system, for example, a feasible value of the circular scan frequency can, as an illustration, be 10 megacycles per second, and a similar illustrative value of the radius can be one-fiftieth of the picture height. In addition to this high frequency circular scan, which is superposed only for mosaics B and C, all three mosaics are scanned synchronously in the normal scanning pattern, such as, e. g., the 525-line rectilinear interlaced pattern which is customarily employed in standard American commercial television practice.

Figures 2, 3:
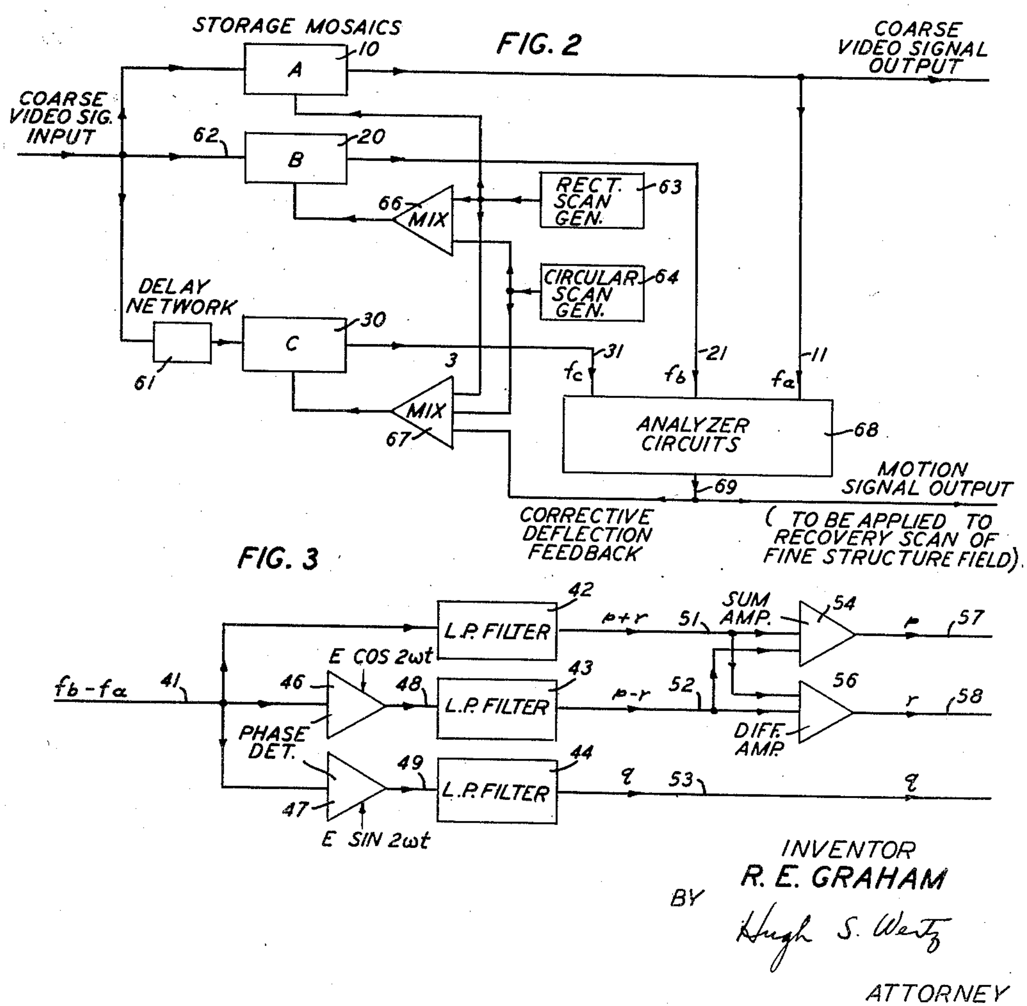
Fig. 2 is an over-all block diagram of one specific embodiment of the motion computer.
Fig. 3 is a block diagram of one exemplary arrangement for the measurement of the differential coefficients.

An over-all block diagram of an illustrative embodiment of the motion computer is shown in Fig. 2. The coarse video signal 62 is supplied directly to the two storage mosaics A and B (elements 10 and 20) and through a delay network 61 to mosaic C (element 30). This coarse video signal 62 is, in an illustrative arrangement, the same coarse component signal that is formed in the practice of the invention described in the above-identified copending application, either, for example, as the result of operating on a complete video signal with electrical filters to separate the coarse and fine components or as the result of separation by coarse and fine image dissector tubes. The storage scan is carried out in the normal rectilinear pattern for all three mosaics, this normal scan being generated by a rectilinear scan generator 63. For the recovery scan, mosaic A (element 10) requires the same rectilinear pattern, while mosaics B and C (elements 20 and 30) require the rectilinear pattern plus a high frequency circular scan supplied by a circular scan generator 64. The combined rectilinear and circular scanning pattern for these two mosaics is produced by electronic mixing of the outputs of the two scan generators in mixers 66 and 67, in accordance with well-known electronic techniques. A special feature of the specific embodiment of the invention shown in Fig. 2, which, it is to be understood, is not a necessary feature for the proper functioning of the invention, but which possesses certain advantages, is that the motion signals 69 obtained from the computer are fed back to the deflection system of mosaic C to cancel the effects of the original subject displacement. The principal advantage of this feedback arrangement is that the various computations need not be performed accurately. Thus, mixer 67, whose output determines the recovery scan from mosaic C, has as a third input a feedback deflection signal 69. The time signals 11, 21, and 31 recovered from the three mosaics 10, 20 and 30, respectively, are operated on by a group of analyzer circuits 68 to yield the desired motion signal output 69 to be applied to the recovery scan of the fine structure field and, in the feedback version of the invention, to the C mosaic (30) deflection system as well (via mixer 67). The operation of this analyzer 68 will be discussed in greater detail with reference to Figs. 3 and 4.

Figure 9:
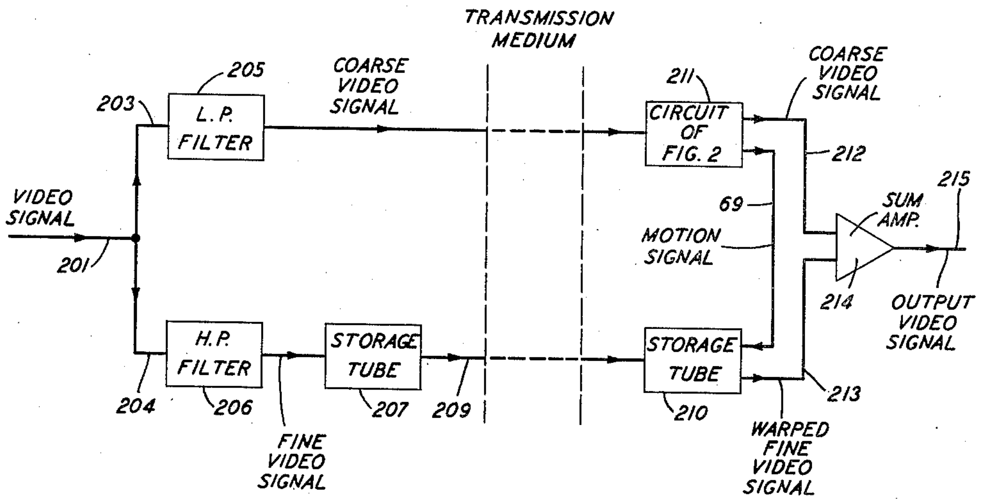
Fig. 9 is an over-all block diagram of a simple illustrative embodiment of a reduced band width television system in which the present invention is employed.

In Fig. 9, there is illustrated the relationship of the present invention to that of the above-identified copending application. For purposes of illustration, in Fig. 9, the circuit of Fig. 2 is shown in block form as constituting the present invention. Also for purposes of illustration, the simplest embodiment and most schematic representation of the invention of the copending application has been shown in Fig. 9. It is, of course, obvious that any of the several arrangements of the present invention can operate perfectly well in conjunction with any of the several embodiments of the invention of the copending application. As indicated in Fig. 9, a conventionally generated video signal 201 is split into two transmission paths 203 and 204 containing complementary low-pass and high-pass filters 205 and 206. In a specimen arrangement, the transmission band of the low-pass filter 205 can extend from zero frequency to approximately 10 per cent of the normal top video frequency; while that of the high-pass filter may start at about 10 per cent of the normal maximum frequency. The signal from the low-pass filter is transmitted directly in accordance with standard practice, but the high-pass signal is first recorded on the mosaic of a storage tube 207. The pick-up beam of the storage tube is scanned in the same geometric pattern or raster as the recording scan but at a much lower repetition rate, which, to choose an illustrative value, can be one-tenth of the recording rate. Thus, the outgoing collector signal 209 is a slowly repeated version of the original by-pass video signal from the high-pass filter. At the receiver, the modified (i. e., having a reduced repetition rate) fine structure signal 209 is stored in a storage tube 210 similar to the one used at the transmitting point, but the recording scan is now carried out at the low repetition rate and the pick-up at the original high repetition rate, thereby producing an output time signal identical with the original fine structure signal when there is no motion in the televised scene. The coarse video signal, however, is applied to a circuit 211, which represents the present invention as illustrated in Fig. 2. This circuit 211 yields two outputs, viz., a motion signal 69 and a simple coarse video signal 212 which corresponds to the output of the low-pass filter 205. The motion signal 69 is applied to the pick-up scan of the storage tube 210, and its effect is to warp the fine video signal so as to bring it into register with the coarse signal, as discussed elsewhere herein. This warped fine video signal 213 is then added (in summation amplifier 214) to the coarse video signal 212 to form a complete video signal 215 once more, which signal can be used to reproduce the television image in the usual way.

It is evident that the signal derived from mosaic A (element 10) can be expressed simply as $$f_a(x,y)=f(x,y) \qquad (1)$$

where $x$ and $y$ are functions of time according to the rectilinear scanning pattern. The expression for the B and C signals are complicated by the superposed circular scan and that for the C signal is further complicated by the time delay (which introduces the increments due to subject motion), but it is readily demonstrable, through the use of a Taylor's expansion (neglecting higher order terms) and other straightforward mathematics, that the B signal can conveniently be expressed as $$f_b(x,y)=f(x,y)+R[m\cos\omega t+n\sin\omega t]+\frac{R^2}{4}[(p+r)+(p-r)\cos 2\omega t+2q\sin 2\omega t] \qquad (2)$$

and the C signal as $$f_c(x,y)=f(x,y)+m(h+R\cos\omega t)+n(k+r\sin\omega t)+\frac{1}{2}[p(R^2\cos^2\omega t+h^2+2hR\cos\omega t)+r(R^2\sin^2\omega t+k^2+2kR\sin\omega t)+2q(hk+kR\cos\omega t+hR\sin\omega t+R^2\sin\omega t\cos\omega t)] \qquad (3)$$

where $$m=\frac{\partial f}{\partial x},\ n=\frac{\partial f}{\partial y},\ p=\frac{\partial^2 f}{\partial x^2},\ q=\frac{\partial^2 f}{\partial x\partial y},\ r=\frac{\partial^2 f}{\partial y^2}$$

R is the radius of the circular scan, and $\omega$ is the angular velocity of that scan ($2\pi$ times the frequency of revolution).

Subtracting (1) from (2), there results, $$f_b-f_a=R(m\cos\omega t-n\sin\omega t)+\frac{R^2}{4}[(p+r)+(p-r)\cos 2\omega t+2q\sin 2\omega t] \qquad (4)$$

and it is readily seen that the bracketed group of terms in this expression contains the desired information about the differential coefficients $p$, $q$, and $r$. This information is utilized in an exemplary embodiment of the invention in the manner illustrated in Fig. 3.

The term in $(p+r)$ is filtered out as a video frequency signal 51 by means of a low-pass filter 42. The terms in $(p-r)$ and $q$ are separated out by applying the $(f_b-f_a)$ signal 41 to a pair of phase selective demodulators 46 and 47, such as are well known in the electronic art, demodulator 46 being supplied with a carrier $E\cos 2\omega t$ and demodulator 47 with a carrier $E\sin 2\omega t$, in accordance with well-known electronic techniques. The outputs, 48 and 49, respectively, of these two demodulators then pass through low-pass filters 43 and 44, respectively, thereby yielding video frequency signals 52 and 53, respectively proportional to $(p-r)$ and $q$. By combining the $(p+r)$ signal 51 and the $(p-r)$ signal 52 in an ordinary summation amplifier 54, a signal 57, representative of the differential coefficient $p$, is obtained, and a similar combination of signals 51 and 52 in a conventional difference amplifier 56 yields a signal 58 which is representative of the coefficient $r$.

Figure 4:
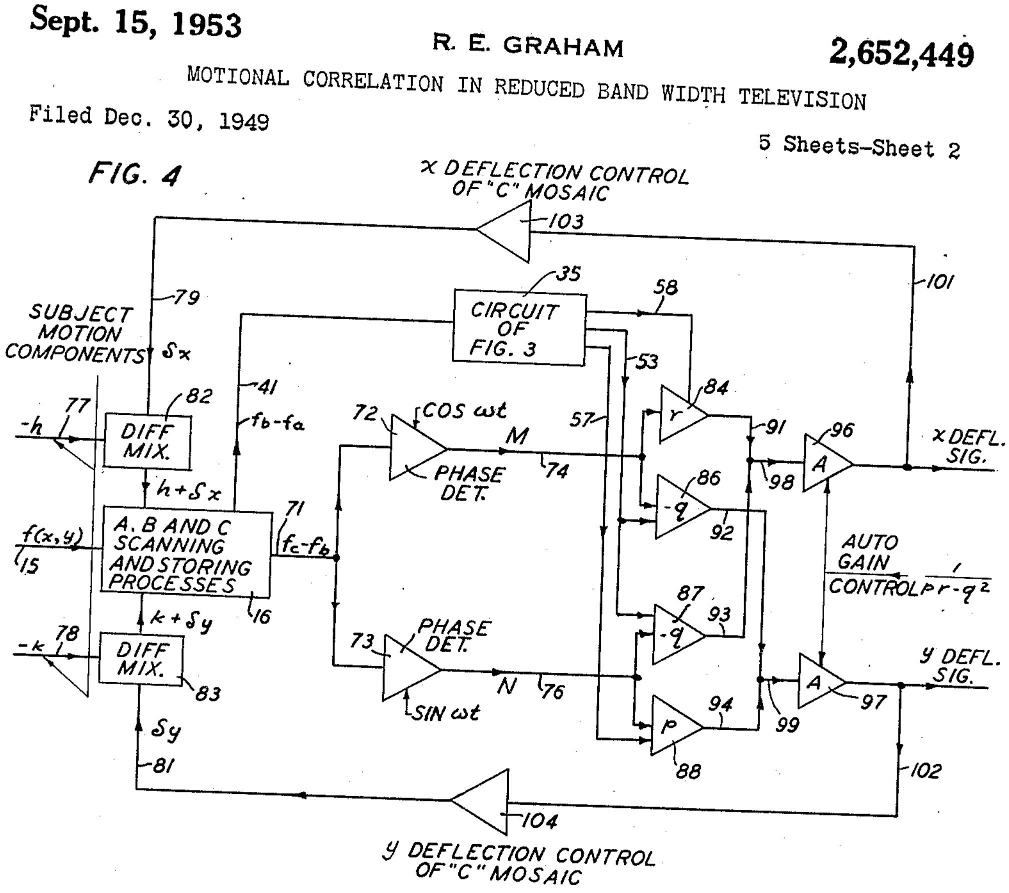
Fig. 4 is an over-all block diagram of the same specific embodiment of the invention shown in Fig. 2, containing certain details not found in Fig. 2, but omitting others therein shown.

The manner in which these coefficients are utilized in the operation of the invention is shown in Fig. 4, which is, like Fig. 2, an over-all block diagram of the illustrative feedback version of the motion computer, but which includes certain details not to be found in Fig. 2, while omitting others which are sufficiently set forth in that figure. Before referring specifically to Fig. 4, however, it will be of value to examine an important mathematical relationship. If the B signal $f_b$ (Equation 2) is subtracted from the C signal $f_c$ (Equation 3), there results $$f_c-f_b=[mh+nk+\frac{1}{2}ph^2+\frac{1}{2}rk^2+qhk]+(ph+qk)R\cos\omega t+(qh+rk)R\sin\omega t. \qquad (5)$$

It is evident that the bracketed group of terms in Equation 5 constitutes a video frequency signal, while the second and third groups consist of video frequency modulations of the high frequency carrier (of angular velocity $\omega$). As shown in Fig. 4, the entire signal 71 represented by Equation 5 is applied to a pair of phase-selective demodulators 72 and 73, demodulator 72 being supplied with a local carrier $E\cos\omega t$ and demodulator 73 with a carrier $E\sin\omega t$. In this manner, two video frequency signals 74 and 76 are separated out, 74 being proportional to $(ph+qk)$ and 76 to $(qh+rk)$. These quantities can conveniently be represented as M and N, such that $$M=ph+qk \qquad (6)$$

and $$N=qh+rk \qquad (7)$$

Solving these simultaneous equations gives:

$$h=\frac{rM-qN}{pr-q^2} \qquad (8)$$

and $$k=\frac{pN-qM}{pr-q^2} \qquad (9)$$

Since the differential coefficients $p$, $q$, and $r$ have been determined by the operation of a circuit such as that illustrated in Fig. 3, all that remains to obtain motion signals proportional to $h$ and $k$ is to perform the addition, multiplication, and division indicated in Equations 8 and 9, and these operations can be carried out by circuits that are well known in the electronic art, utilized, for example, in the manner shown in Fig. 4.

The over-all operation of an illustrative embodiment of the feedback type motion computer is also shown in Fig. 4. The effects of the subject motion are represented as the input components, $-h$ and $-k$ (77 and 78, respectively). The corrective deflections due to the motion signal feedback are represented by the components $\delta x$ and $\delta y$ (79 and 81, respectively). These two sets of components oppose each other, as indicated symbolically by the differential mixers 82 and 83, in which the $x$ and the $y$ components, respectively, are combined. Thus, the net relative displacements at the C mosaic are $(h+\delta x)$ and $(k+\delta y)$. The remaining source of input information is the coarse field image itself, $f(x,y)$. This coarse field image 15 undergoes a series of scanning and storage processes in a group of circuits 16, whose operation is shown in greater detail in Figs. 1 and 2 and has been discussed in connection therewith. In that the exemplary embodiment of the invention shown in Fig. 4 is a feedback version of the motion computer, it is obvious that the quantities $h$ and $k$ which have hereinabove been discussed are replaced by quantities $(h+\delta x)$ and $(k+\delta y)$. The signal 74, representative of the quantity M, is fed to two multiplier circuits 84 and 86, which are supplied, respectively, by signals 58 and 53, which are representative, respectively, of the quantities $r$ and $q$. These signals, as well as a signal 57, representative of the quantity $p$, are derived from a group of circuits 35 which were above described in greater detail in connection with Fig. 3. The signal 76, representative of N, is similarly applied to multipliers 87 and 88, which are supplied by signals 53 and 57, respectively, representative of quantities $q$ and $p$, respectively. The output signal 91 of multiplier 84 (representative of $r$M) is then added to the output signal 93 of multiplier 87 (representative of $-q$N) to yield a signal 98 which is representative of the numerator $(rM-qN)$ of Equation 8 above for the $x$ component $(h)$ of subject motion. In like manner, the output signal 92 of multiplier 86 (representative of $-q$M) is added to the output signal 94 of multiplier 88 (representative of $p$N) to yield a signal 99 which is representative of the numerator $(pN-qM)$ of Equation 9 above for the $y$ component $(k)$ of subject motion. These operations thus completely divorce the $x$ and $y$ components of the motion signal. The signals 98 and 99 are then transmitted through amplifiers 96 and 97, respectively, each of which has its gain controlled roughly as $(pr-q^2)^{-1}$ by a group of circuits 50, shown in greater detail in Figs 7 and 8. The output signal 101 of amplifier 96 now represents the $x$ component $(h)$ of the motion signal (see Equation 8) and it is fed back, in this particular version of the invention, to the $x$ deflection control 103 of the C mosaic 30 to yield a spatial subject motion component 79 $(\delta x)$, which is compared with the actual subject motion component $(-h)$ in the differential mixer 82, as discussed above. Similarly, output signal 102 of amplifier 97 represents the $y$ component of the motion signal (see Equation 9) and it is fed back to the $y$ deflection control 104 of the C mosaic to yield the approximate $y$ component of motion 81, which is compared with $(-k)$ in differential mixer 83. Provided that the gains of both the $x$ and $y$ loops are kept high, the resulting deflections 79 $(\delta x)$ and 81 $(\delta y)$ will be closely equal to 77 $(-h)$ and 78 $(-k)$, respectively, and thus the deflection voltages may be taken as a measure of the subject motion.

The advantage of the feedback arrangement in this exemplary embodiment of the invention is, as explained above, that the various computations need not be performed accurately, the prime requirement being that the $x$ and $y$ loop gains be kept moderately high. The function of the automatic gain control is to maintain a negative polarity of transmission around the feedback loops regardless of the signs of $p$, $q$, and $r$, and to keep the loop gains from varying too greatly. If the multiplying and combining operations leading to the voltages representative of $(rM-qN)$ and $(pN-qM)$ are performed inaccurately, there may occur cross-coupling between the $x$ and $y$ loops, but it can be shown that cross-couplings of the order of 30 to 50 per cent will be tolerable.

It can readily be shown algebraically that in the situation where $pr=q^2$ no solution can be found for $h$ and $k$ by the means described above. Even for values of $p$, $r$ and $q$ which nearly satisfy this relationship (which will be referred to as the "boundary case"), the gain required of the controlled amplifiers 96 and 97 will be excessive and the loop gains will drop off. Thus, in accordance with the invention, an additional exemplary embodiment is provided which includes an illustrative feasible arrangement for circumventing this difficulty. It can be shown that it is not necessary in the boundary case to know the individual components $h$ and $k$, since any deflection which undoes the effect of the original subject motion will suffice. The simplest choice, therefore, is to introduce the corrective deflection along the normal to the contour lines, thereby effectively treating the component of subject motion normal to the contour lines and ignoring the component parallel thereto, and this is done in the specific embodiment of the invention now to be discussed It is demonstrable that the required $x$ and $y$ correcting deflections in this exemplary arrangement are given by $$\delta x=\frac{ph\pm\sqrt{pr}k}{p+r} \tag{10}$$

and $$\delta y=\frac{\pm\sqrt{pr}h+rk}{p+r} \tag{11}$$

where the chosen sign of the $\pm$ is the same as the sign of $q$. It is also readily demonstrable that for the so-called boundary case $(pr=q^2$ or $q=\pm\sqrt{pr})$, the expressions for M and N are $$M=ph\pm\sqrt{pr}k \tag{12}$$

and $$N=\pm\sqrt{pr}h+rk \tag{13}$$

so that all that is needed to convert M and N into the required deflection signals is to divide them by $(p+r)$. And again, if a feedback version of the invention is employed, this division can be fairly rough, the most important requirement being the maintenance of proper polarity.

Figure 5:
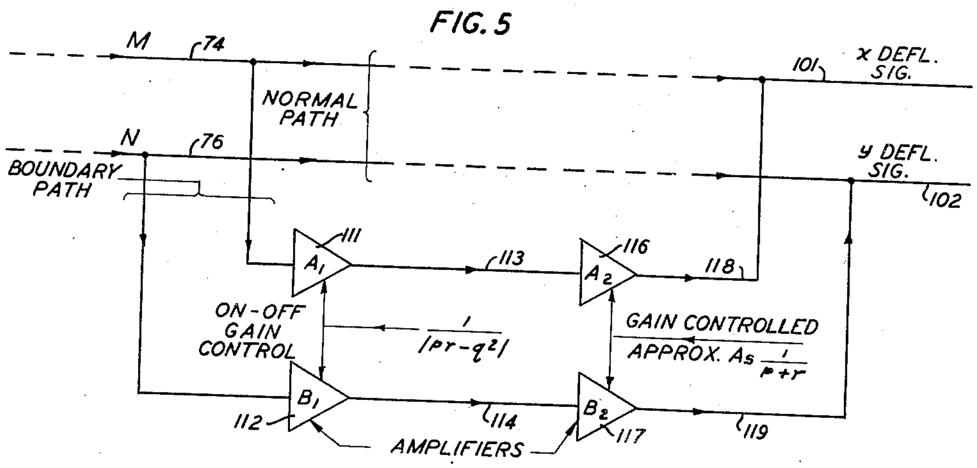
Fig. 5 is a block diagram of the alternate computer paths in one embodiment of the motion computer which is of value in the so-called "boundary" case.

In Fig. 5 there is illustrated one exemplary embodiment of the invention which is feasible for boundary case operation. Signals 74 and 76, representative of M and N, respectively (generated as described in connection with Fig. 4) are tapped off and fed to amplifiers 111 and 112, respectively. These amplifiers are gain controlled in such a way as to have zero transmission except when the absolute value of the quantity $(pr-q^2)$ is very small, i. e., when the boundary case is approximately realized. It is worthy of note that it is not necessary to disable the normal path under this condition, since its outputs go to zero. The outputs 113 and 114, respectively, of amplifiers 111 and 112, respectively, are connected to amplifiers 116 and 117, respectively, which are gain controlled approximately as $(p+r)^{-1}$, thereby yielding signals 118 and 119, which are respectively the $x$ and $y$ deflection signals. The outputs of amplifiers 116 and 117 are connected in parallel with the deflection outputs 101 and 102 of the normal path, so that the composite system thus formed will operate satisfactorily for all combinations of $p$, $q$ and $r$.

In the practice of the specific embodiment of the invention illustrated in Fig. 4 and discussed in connection therewith, an automatic gain control proportional to the reciprocal of the quantity $(pr-q^2)$ is required, and in the exemplary embodiment of Fig. 5, two gain controls, one proportional to the reciprocal of the absolute value of the quantity $(pr-q^2)$ and the other proportional to the reciprocal of the quantity $(p+r)$, are employed. An illustrative example of a system which can, in accordance with the invention, be used to furnish these gain controls is shown in Fig. 7, and an alternative arrangement is drawn in Fig. 8, while Fig. 6 illustrates a specimen system of providing gain control input signals.

Figure 6:
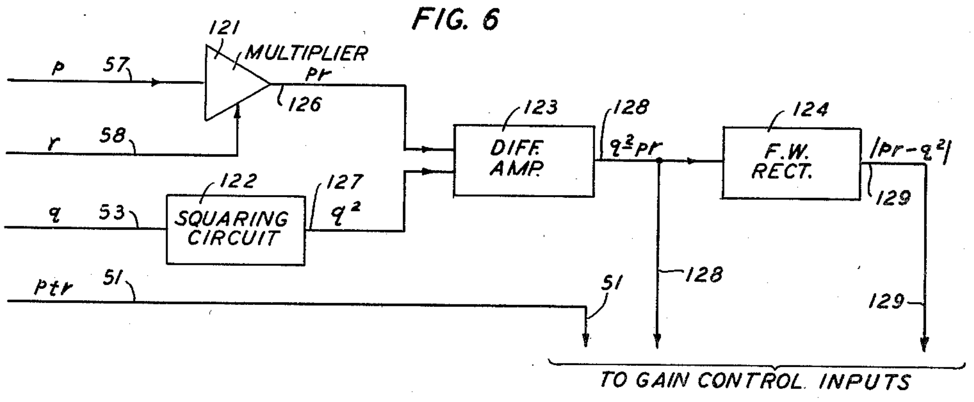
Fig. 6 is a block diagram of circuits which can be employed in the practice of the invention to yield signals serving as inputs to the several gain control circuits.

Referring now to Fig. 6, signals 57 and 58, representative, respectively, of the quantities $p$ and $r$ and generated according to the techniques discussed in connection with Fig. 3, are fed to a multiplier circuit 121 to yield a signal 126, which is representative of the quantity $pr$. In addition, a signal 53, representative of the quantity $q$ and also generated in accordance with the circuits of Fig. 3, is squared in a squaring circuit 122, several forms of which are well known in the electronic art, to yield a signal 127, representative of the quantity $q^2$. The signals 126 and 127 are then combined differentially in a common difference amplifier 123, providing an output signal 128, representative of the quantity $(q^2-pr)$. Part of this output signal 128 passes through a full-wave rectifier 124 so as to yield a resultant signal 129, representative of the absolute value of the quantity $(pr-q^2)$, while part of output signal 128 is fed to the input of one of the gain control circuits. The other gain control inputs are provided by signal 129 and a signal 51, which is representative of the quantity $(p+r)$ and is generated in accordance with the arrangement described in connection with Fig. 3. These gain control inputs, in accordance with one embodiment of the invention are each fed to a "divider" circuit of the type shown in Fig. 7.

Figure 7:
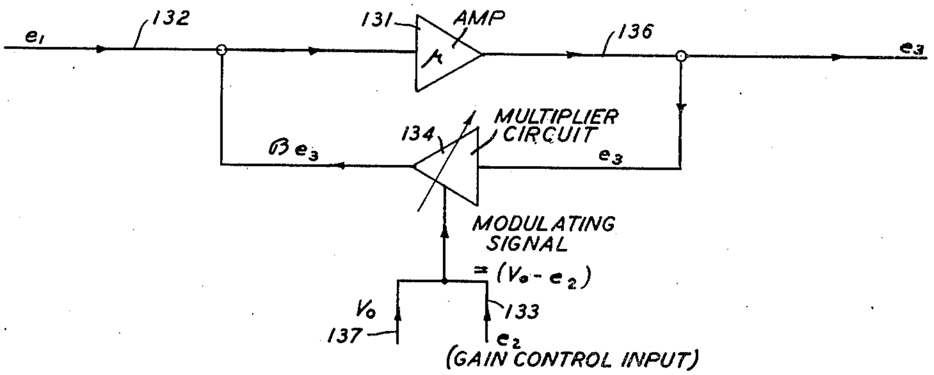
Fig. 7 shows one illustrative embodiment of a reciprocal gain control circuit which can be utilized in the invention.

The amplifier 131 of Fig. 7 represents symbolically any of the gain-controlled amplifiers which are used in the practice of the invention, viz., amplifiers 96 and 97 of Fig. 4 and amplifiers 111, 112, 116 and 117 of Fig. 5. It is evident then that the desired operation of the circuit of Fig. 7 is to divide a signal 132 (herein designated "$e_1$"), which represents symbolically any of the respective input signals (such as 98 and 99, for example, in Fig. 4) to the several gain-controlled amplifiers, by another signal 133 (herein designated "$e_2$"), which represents symbolically any of the respective gain control input signals to the several gain-controlled amplifiers. This input signal 133 is, of course, supplied by any one of the output signals 51, 128 or 129 of Fig. 6, according to the particular function of reciprocal gain control being employed.

If it is assumed that the amplifier characteristic $\mu$ of amplifier 131 has substantially zero phase and constant amplitude over the range of frequencies in interest, then, within that frequency band, $\mu$ is simply a real number. It can further be assumed that the multiplier circuit 134 is characterized by a gain relative to the signal 136 (the output of amplifier 131, herein designated "$e_3$") which is given by $$\beta=k(V_0-e_2)$$

where $k$ is a constant of the multiplier circuit and $V_0$ is a properly chosen bias 137. A ring-type modulator, such as is well known in the electronic art, can, for example, be made to work in approximately such fashion. It is then readily demonstrable that $$e_3=\frac{e_1}{\frac{1}{\mu}-kV_0+ke_2}$$

In accordance with the invention, the bias $V_0$ can be made equal to $$\frac{1}{\mu k}$$

so that $e_3$ is simply $$\frac{e_1}{ke_2}$$

which is the desired relation for the divider circuit, since $e_2$ is, in the several circuits employed, supplied, respectively, by signal 51 (representative of the quantity $(p+r)$), signal 128 (representative of the quantity $(q^2-pr)$), and signal 129 (representative of the absolute value of the quantity $(pr-q^2)$).

It is to be noted that, in the example of practice just described, the loop gain is $$\mu\beta=1-\mu ke_2$$

so that when $e_2=0$ there is unity positive feedback and the amplifier 131 imparts infinite gain to a signal 132 ($e_1$). And, when $\mu ke_2$ becomes negative, $\mu\beta$ is positive and larger than unity. As an isolated system, the circuit would be unstable under this condition and would tend to "run away." When, however, the circuit is an interconnected part of an over-all network which forces the circuit to "behave," as is the case in the practice of the invention, then the above-described arrangement can safely be used for any values of $\mu ke_2$.

Figure 8:
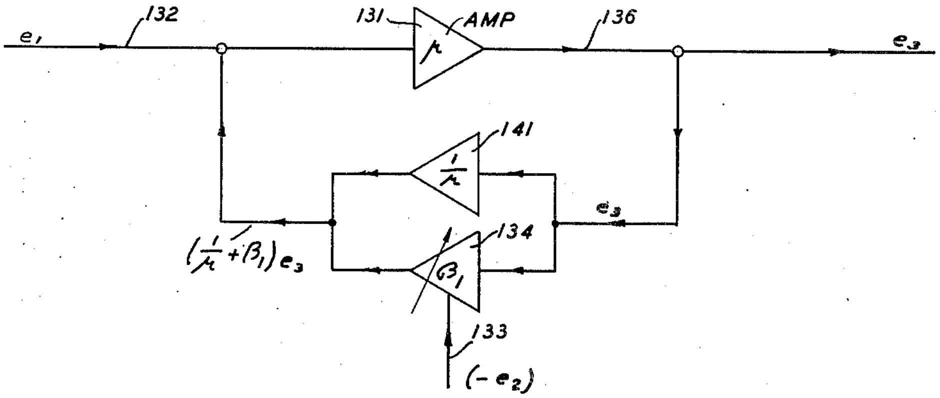
Fig. 8 illustrates another exemplary embodiment of a reciprocal gain control circuit.

An alternative arrangement which can be used to provide the reciprocal gain controls in accordance with invention is shown in Fig. 8. This circuit is similar to that of Fig. 7, except that the bias signal 137 ($V_0$) of that figure is eliminated and a shunt transmission network 141, having a transmission characteristic $$\frac{1}{\mu}$$

is added to the multiplier circuit 134 (now designated $\beta_1$). It can readily be shown that this produces the desired over-all relation, as before. This circuit is somewhat more simple to construct in practice than the one of Fig. 7, since it is not a requirement of this alternative arrangement to have the transmission characteristic $\mu$ phaseless and constant over the frequency band. It is sufficient merely to approximate the reciprocal of $\mu$ in the added transmission network 141 around the multiplier 134.

Figure 10:
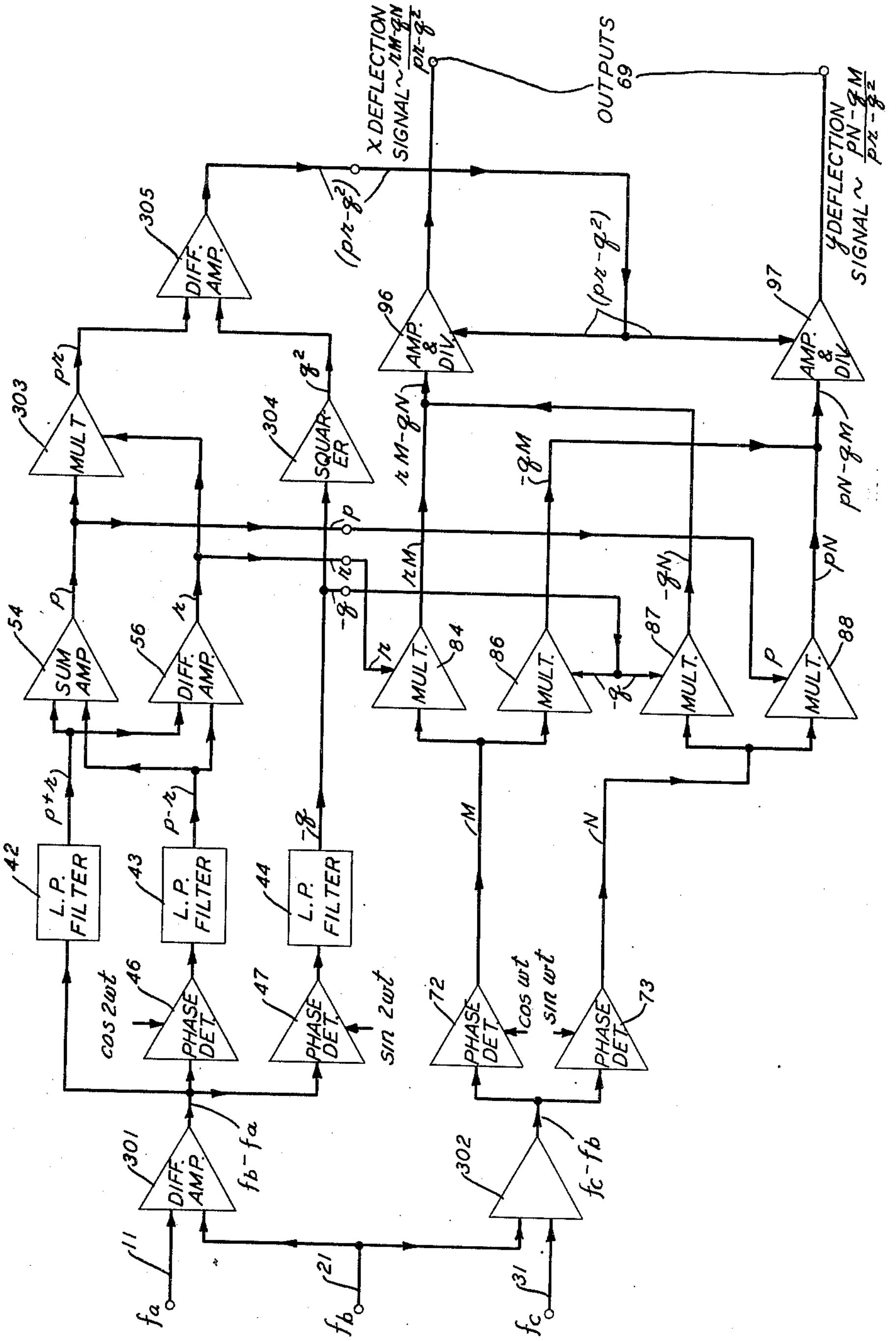
Fig. 10 illustrates schematically an arrangement for performing the computer operations called for in the system shown in Fig. 2.

In summary, it can be seen that the analyzer circuits 68 shown in Fig. 2 for providing the motion signal outputs 69 can be represented as shown in Fig. 10 by an arrangement of electronic calculating elements, all of which can be of a kind known hitherto in the electronic art. For example, suitable calculating elements are described in volume 21 of the Radiation Laboratories Series, entitled "Electronic Instruments," published by McGraw-Hill Book Company, Incorporated, New York (1948). Therein, addition and subtraction elements are described on pages 41 and 42; multiplication, division and squaring elements are described on pages 48 through 60; and phase detecting elements are described on pages 383 through 386. Suitable dividing elements have also been described more particularly with reference to Figs. 7 and 8 in this specification.

With particular reference now to Fig. 10, the three signals 11, 21, and 31 ($f_a$, $f_b$, and $f_c$), derived from mosaics A, B, and C, respectively are supplied to the differential amplifiers 301 and 302 and there is obtained therefrom the differences $(f_b-f_a)$ and $(f_c-f_b)$, respectively. As has been described above with reference to Fig. 3, by means of the phase detectors 46 and 47, the low-pass filters 42, 43 and 44, and the summation and differential amplifiers 54 and 56, respectively, there can be derived from the difference $(f_b-f_a)$ measures of the differential quantities $p$, $q$ and $r$, which have been defined above. From these quantities, by means of a multiplying circuit 303, the squarer 304, and the differential amplifier 305, there can be obtained a measure of the quantity $(pr-q^2)$ which appears as the denominator in the fractional expressions (8) and (9) developed above for the desired signals $h$ and $k$, respectively. An arrangement of this kind has been described in more detail above with reference to Fig. 6. Similarly, as has been described above, with reference to Fig. 4, from the difference $(f_c-f_b)$, by means of the phase detectors 72 and 73 and suitable filtering, there are obtained measures of the quantities M and N which have been defined above. From these, in turn, by means of the multiplying circuits 84, 86, 87 and 88, and the measures of the quantities $p$, $q$ and $r$, already obtained there are derived the quantities $$(rM-qN) \text{ and } (pN-qM)$$

which appear above as the numerators in expressions (8) and (9), respectively. Then, by means of the amplifying and dividing circuits 96 and 97, which more particularly can, for example, be of either of the forms shown schematically in Figs. 7 and 8, there can be derived the outputs 69, the $h$ and $k$ signals which represent respectively, the desired $x$ and $y$ deflection signals for use as described with reference to Fig. 2.

It should be noted that the several specific embodiments of the motion computer hereinabove described interpose only a fixed delay between the signals to mosaics B and C. Application of the invention to the basic band width reduction system of my copending application requires, on the other hand, a delay which varies cyclically, because of the nature of the storage operations upon the fine detail video signal. The rest of the computer circuits would be unaffected by the insertion of the cyclical delay. Such a delay can, in accordance with the invention, be provided, for example, by carrying the coarse signal through the identical sequence of storage operations undergone by the fine signal.

It is to be understood that the above-described arrangements are illustrative of the application of the principles of the invention. Numerous other arrangements may be devised by those skilled in the art without departing from the spirit and scope of the invention.

What is claimed is:

1. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, and means for producing from said fine detail signals which have not been discarded, from said coarse signals, and from said resultant signal a television image signal representative of said pictorial subject.

2. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, means for operating on said fine detail signals which have not been discarded with said resultant signal to form an altered fine detail signal, and means for producing from said altered fine detail signal and from said coarse signals a television image signal representative of said pictorial subject.

3. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, said means including a plurality of storage tube devices, and means for producing from said fine detail signals which have not been discarded, from said coarse signals, and from said resultant signal a television image signal representative of said pictorial subject.

4. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, said means including a plurality of storage tube devices, means for recording said coarse signals on all but one of said storage tube devices, and means for recording a version of said coarse signals delayed by a predetermined period of time on the other of said storage tube devices, and means for producing from said fine detail signals which have not be discarded, from said coarse signals, and from said resultant signal a television image signal representative of said pictorial subject.

5. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, said means including a plurality of storage tube devices, means to operate the pick-up scans of said storage tube devices synchronously in a normal rectilinear scanning pattern, and means additionally to operate the pick-up scan of two of said storage tube devices in a circular pattern, and means for producing from said fine detail signals which have not been discarded, from said coarse signals, and from said resultant signal a television image signal representative of said pictorial subject.

6. In a television system in which separate signals are formed representing fine and coarse detail of a pictorial subject, means for discarding periodically a portion of the fine detail signals, means for deriving from said coarse detail signals a resultant signal having information relative to the motion of said pictorial subject, said means including a plurality of storage tube devices to which said coarse detail signals are applied, means for recovering from said storage tube devices signals containing said motional information, and analyzer circuit means for operating on said recovered signals to yield said resultant signal, and means for producing from said fine detail signals which have not been discarded, from said coarse signals, and from said resultant signal a television image signal representative of said pictorial subject.

7. A system for estimating the motion in a televised pictorial subject, said system comprising a plurality of storage tube devices to which video signals representative of said pictorial subject are applied, means for recovering from said storage tube devices signals containing motional information concerning said pictorial subject, analyzer circuit means for operating on said recovered signals to yield resultant signals having information relative to the motion of said pictorial subject, said analyzer circuit means including means for subtracting the signal recovered from one of said storage tube devices from the signal recovered from another of said storage tube devices, and means for operating on the difference signal produced by said subtraction with a pair of quadrature phase detectors so as to yield signals containing information relative to the vectorial components of motion of said pictorial subject, and means for feeding back said resultant signals to one of said storage tube devices.

8. A system for estimating the motion in a televised pictorial subject, said system comprising a plurality of storage tube devices to which video signals representative of said pictorial subject are applied, means for recovering from said storage tube devices signals containing motional information concerning said pictorial subject, analyzer circuit means for operating on said recovered signals to yield resultant signals having information relative to the motion of said pictorial subject, said analyzer circuit means including means for subtracting the signal recovered from one of said storage tube devices from the signal recovered from another of said storage tube devices, and means for operating on the difference signal produced by said subtraction with a pair of quadrature phase detectors so as to yield signals containing information relative to the vectorial components of motion of said pictorial subject, said signals containing the vectorial information being further operated on by means including a plurality of multiplier circuits so as to yield signals approximating the vector components of motion of said pictorial subject.

9. A system for estimating the motion in a televised pictorial subject, said system comprising a plurality of storage tube devices to which video signals representative of said pictorial subject are applied, means for recovering from said storage tube devices signals containing motional information concerning said pictorial subject, analyzer circuit means for operating on said recovered signals to yield resultant signals having information relative to the motion of said pictorial subject, said analyzer circuit means including means for subtracting the signal recovered from one of said storage tube devices from the signal recovered from another of said storage tube devices, and means for operating on the difference signal produced by said subtraction with a pair of quadrature phase detectors so as to yield signals containing information relative to the vectorial components of motion of said pictorial subject, said signals containing the vectorial information being further operated on by means including a plurality of multiplier circuits so as to yield signals approximating the vector components of motion of said pictorial subject, and means for feeding back said resultant signal to one of said storage tube devices.

10. A system for estimating the motion in a televised pictorial scene comprising first, second and third storage surfaces, means for storing video signals, representative of the pictorial scene, in a rectilinear scanning pattern on the first and second storage surfaces, means for storing video signals, representative of the pictorial scene at an earlier predetermined time, on the third storage surface, means for scanning the first storage surface in the rectilinear scanning pattern for deriving a first signal, means for scanning the second and third storage surfaces in a scanning pattern which results from the superposition of a circular scanning pattern on the rectilinear scanning pattern for deriving second and third signals, respectively, and computing means supplied with the first, second and third signals for deriving output signals which represent a measure of the motion in the pictorial scene since the earlier predetermined time.

ROBERT E. GRAHAM.

References Cited in the file of this patent

UNITED STATES PATENTS

| Number | Name | Date |
|---|---|---|
| 1,769,920 | Gray | July 8, 1930 |
| 2,202,605 | Schroter | May 28, 1940 |
| 2,293,899 | Hanson | Aug. 25, 1942 |
| 2,306,435 | Graham | Dec. 29, 1942 |
| 2,321,611 | Moynihan | June 15, 1943 |
| 2,381,902 | Goldsmith | Aug. 14, 1945 |
| 2,403,975 | Graham | July 16, 1946 |

FOREIGN PATENTS

| Number | Country | Date |
|---|---|---|
| 324,399 | Great Britain | Jan. 27, 1930 |
| 909,949 | France | Jan. 14, 1946 |